(12) United States Patent
Abe (10) Patent No.: US 6,717,749 B2
(45) Date of Patent: Apr. 6, 2004

(54) CEMENTED LENS GROUP

(75) Inventor: Tetsuya Abe, Hokkaido (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/284,089

(22) Filed: Oct. 31, 2002

(65) Prior Publication Data

US 2003/0081331 A1 May 1, 2003

(30) Foreign Application Priority Data

Nov. 1, 2001 (JP) ........................................ 2001-336164
Nov. 1, 2001 (JP) ........................................ 2001-336166

(51) Int. Cl.[7] .............................. G02B 9/00; G02B 9/04; G02B 3/02; G02B 7/02
(52) U.S. Cl. .................. 359/796; 359/793; 359/717; 359/819; 359/825; 359/830
(58) Field of Search ................................ 359/793, 796, 359/717, 647, 819, 825, 830

(56) References Cited

U.S. PATENT DOCUMENTS

| 2,092,789 A | 9/1937 | Tillyer |
| 4,168,339 A | 9/1979 | Kerko et al. |
| 4,227,950 A | 10/1980 | Spycher |
| 4,261,656 A | 4/1981 | Wu |
| 4,264,156 A | 4/1981 | Spycher |
| 4,268,134 A | 5/1981 | Gulati et al. |
| 4,679,918 A | 7/1987 | Ace |
| 5,253,111 A | 10/1993 | Chiba et al. |
| 5,905,545 A | * 5/1999 | Poradish et al. ............ 348/743 |
| 6,466,294 B1 | * 10/2002 | Yamagishi et al. ......... 349/155 |

FOREIGN PATENT DOCUMENTS

JP         53-93245        7/1978

* cited by examiner

Primary Examiner—Georgia Epps
Assistant Examiner—Jack Dinh
(74) Attorney, Agent, or Firm—Greenblum & Bernstein, P.L.C.

(57) ABSTRACT

A cemented lens group includes two lens elements, cementing surfaces of the two lens elements being cemented to each other by an adhesive, wherein the adhesive forms an adhesive layer between the cementing surfaces. A filler made of minute solid material is dispersed throughout the adhesive layer. Alternatively, a spacer which determines the thickness of the adhesive layer is provided around the peripheral portions of the cementing surfaces.

30 Claims, 3 Drawing Sheets

CEMENTED LENS GROUP

BACKGROUND OF THE INVENTION

1. Field of the Invention

The present invention relates to a cemented lens group which can be used in various optical systems.

2. Description of the Prior Art

Achromatic lens groups consisting of at least one positive lens element and one negative lens element which are positioned closely to each other with a slight space therebetween are well-known in the art and used in various optical systems. In such types of achromatic lens groups, each of a convex surface and a concave surface of the two lens elements which face each other with a slight space therebetween has a strong surface power since a strong power is given to each of the positive lens element and the negative lens element to correct axial chromatic aberration. Due to this lens design, if one of the two lens elements becomes eccentric with respect to the other lens element, strong coma aberration and/or flare occur, substantially deteriorating the optical performance of the achromatic lens group. To prevent this problem from occurring, the rim of the lens group and the lens holder thereof have to be made with a high degree of precision so that none of the lens elements become decentered. However, this increases the cost of production.

On the other hand, another type of achromatic lens group which consists of at least one positive lens element and one negative lens element which are cemented to each other is known in the art and used in various optical systems. In this cemented type of achromatic lens group, two lens elements are cemented to each other by an adhesive after the two lens elements are precisely aligned. This achieves an achromatic cemented lens group in which substantially no deterioration in optical performance occurs. However, in the case of a cemented lens group consisting of two lens elements of different glass materials having different thermal expansion coefficients, a variation in temperature causes a difference in outside diameter between the two lens elements. This difference generates a shearing stress exerted on each cementing surface. The shearing stress becomes great, especially when an appreciable variation in temperature occurs. In this case, there is a high possibility that the cemented lens group may become deformed, or in the worst scenario, the cementing surfaces may come off each other (separate) due to the shearing stress.

The difference in the outside diameter between the two lens elements due to a variation in temperature increases as the outside diameter of the cemented lens group increases. Accordingly, the aforementioned problems in cemented lens group become more serious if the cemented lens group has a large diameter. Fluorite and low-dispersion glass have excellent achromatic characteristics, and are often used as materials of high-performance achromatic lens. However, such particular materials have a high thermal expansion coefficient, more than double the thermal expansion coefficient of a typical optical glass material. Accordingly, if a lens element made of such a material having a high thermal expansion coefficient and a lens element made of a typical optical glass material are cemented to each other, the aforementioned problems in the cemented lens group thereof become much more serious.

SUMMARY OF THE INVENTION

The present invention has been devised in view of the aforementioned problems, and accordingly, the present invention provides a cemented lens group consisting of at least two lens elements which are cemented to each other by an adhesive, wherein there is substantially no possibility that the cemented lens group deforms or that the cementing surfaces come off each other by a shearing stress exerted on the cementing surfaces. The present invention is of great value especially when providing a large-diameter cemented lens group, the lens elements of which are made of different glass materials having different thermal expansion coefficients, e.g., a lens element of a typical glass material and a lens element of fluorite or a low-dispersion glass.

The present invention provides a cemented lens group wherein the thickness of the adhesive layer between the lens elements can be easily managed, wherein the optical performance deteriorates little, even if the adhesive layer is elastically deformed.

For example, a cemented lens group is provided, including two lens elements, cementing surfaces of the two lens elements being cemented to each other by an adhesive, the adhesive forming an adhesive layer between the cementing surfaces, wherein filler made of minute solid material is dispersed throughout the adhesive layer.

The filler can be made from resin granules, glass fiber granules, or cut glass fibers.

It is desirable for the following condition (1) to be satisfied:

$$|\Delta\alpha \cdot D/d| < 0.03 \tag{1};$$

wherein $\Delta\alpha$ designates a difference in linear expansion coefficient between the two lens elements cemented to each other, D designates the diameter of each of the lens elements, and d designates a thickness of the adhesive layer having the filler included therein.

It is desirable for the following condition (1') to be satisfied:

$$|\Delta\alpha \cdot D/d| < 0.01 \tag{1'}.$$

It is desirable for the following condition (2) to be satisfied:

$$d/D < 0.002 \tag{2}.$$

It is desirable for the following condition (3) to be satisfied:

$$d > 0.015 \text{ mm} \tag{3}.$$

It is desirable for the following condition (4) to be satisfied:

$$d < 0.2 \text{ mm} \tag{4}.$$

It is desirable for the following condition (5) to be satisfied:

$$D > 80 \text{ mm} \tag{5}.$$

It is desirable for the following condition (6) to be satisfied:

$$|\Delta\alpha| > 0.0000015 \tag{6}.$$

In another embodiment, a cemented lens group is provided, including two lens elements, cementing surfaces of the two lens elements being cemented to each other by an adhesive, the adhesive forming an adhesive layer between the cementing surfaces, wherein a spacer which determines the thickness of the adhesive layer is provided around the peripheral portions of the cementing surfaces.

The spacer can be provided discontinuously around the peripheral portions of the cementing surfaces.

The spacer can be provided continuously around the peripheral portions of the cementing surfaces.

The spacer can include a sandwiched portion which is sandwiched in between the peripheral portions of the cementing surfaces, and a peripheral portion which is provided around an edge portion of one of the two lens elements.

The spacer can be made from a resin film, a resin sheet, or from tin foil.

It is desirable for the following condition (1) to be satisfied:

$$|\Delta \alpha \cdot D/d| < 0.03 \qquad (1);$$

wherein $\Delta \alpha$ designates a difference in linear expansion coefficient between the two lens elements cemented to each other, D designates the diameter of each of the lens elements, and d designates a thickness of the adhesive layer determined by the spacer.

It is desirable for the following condition (1') to be satisfied:

$$|\Delta \alpha \cdot D/d| < 0.01 \qquad (1').$$

It is desirable for the following condition (2) to be satisfied:

$$d/D < 0.002 \qquad (2).$$

It is desirable for the following condition (3) to be satisfied:

$$d > 0.015 \text{ mm} \qquad (3).$$

It is desirable for the following condition (4) to be satisfied:

$$d < 0.2 \text{ mm} \qquad (4).$$

It is desirable for the following condition (5) to be satisfied:

$$D > 80 \text{ mm} \qquad (5).$$

It is desirable for the following condition (6) to be satisfied:

$$|\Delta \alpha| > 0.0000015 \qquad (6).$$

It is desirable that the adhesive be a silicon resin made of an organic silicon compound and that the silicon resin be of an addition-reaction type. Alternatively, the adhesive is made of a silicon resin having elongation of at least 100 percent. The term "Elongation" is a technical term of JIS (Japan Industrial Standard), and is represented by the following equation:

Elongation (%)=(Amount of Extension/Original Length)×100.

Namely, for instance, elongation of 100% and 150% indicate a length which is two times of the original length, and a length which is two and half times of the original length, respectively.

The present disclosure relates to subject matter contained in Japanese Patent Application Nos. 2001-336164 and 2001-336166 (both filed on Nov. 1, 2001) which are expressly incorporated herein in their entireties.

BRIEF DESCRIPTION OF THE DRAWINGS

The present invention will be discussed below in detail with reference to the accompanying drawings, in which.

DESCRIPTION OF THE PREFERRED EMBODIMENTS

Figure 1:
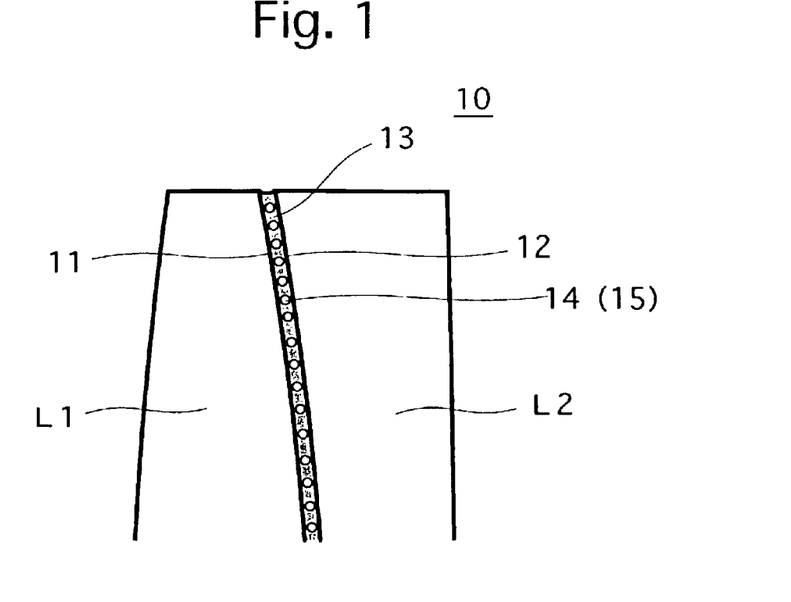
FIG. 1 is a cross-sectional view of a first embodiment of a cemented lens group according to the present invention.
Figure 2:
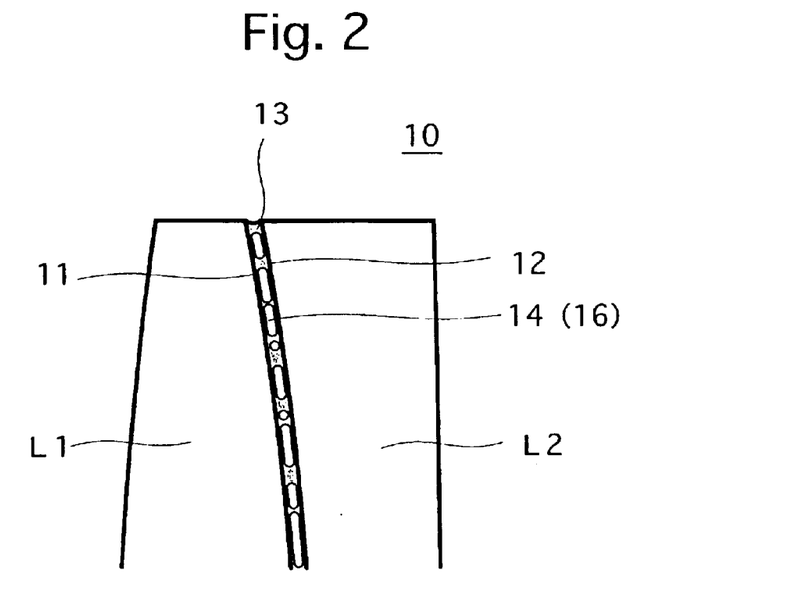
FIG. 2 is a cross-sectional view of a second embodiment of a cemented lens group according to the present invention.

FIGS. 1 and 2 show first and second embodiments of a cemented lens group 10 according to the present invention. Each of the first and second embodiments include a cementing surface 11 of a positive first lens element L1 and a cementing surface 12 of a negative second lens element L2 which are cemented to each other with an adhesive layer 13. Filler 14 is dispersed (mixed/contained) throughout the adhesive layer 13 in advance (i.e., when in a fluid state). In the first embodiment shown in FIG. 1, compound resin or glass spherical granules (minute (fine) solid material) 15 are used as the filler 14. In the second embodiment shown in FIG. 2, cut glass fibers (minute (fine) solid material) 16 are used as the filler 14. The spherical granules 15 and the cut glass fibers 16 are normally used in, for example, liquid crystal display panels, etc.

If the filler 14 is included in the adhesive layer 13 as described above, since the thickness of the adhesive layer 13 can be precisely made even, without the use of any special jig, etc., an uneven thickness of the adhesive layer 13 which is a cause of lens eccentricity can be prevented, preventing deterioration in optical performance thereof. Furthermore, since the adhesive layer 13 is distributed evenly on the cementing surfaces, the shearing stress which is applied to the adhesive layer is also even, so that occurrence of irregular deforming and/or separation of the cemented lenses can be prevented.

In a typical cementing operation of a cemented lens group, a liquid adhesive (e.g., an UV curing adhesive or a heat setting adhesive) is dropped onto one of the two cementing surfaces, and thereafter the other cementing surface is placed on this cementing surface. Subsequently, after air bubbles trapped in the adhesive are removed, one of the two lens elements is moved relative to another so that the optical axes of the two lens elements are precisely aligned. Finally, an adhesive hardening operation in which heat or ultraviolet rays are applied to the adhesive to harden the same is performed. In the cemented lens group shown in FIGS. 1 and 2, in the above-described cementing operation, just by evenly mixing (dispersing) in advance the fillers 15 or 16, which have a predetermined size, in with the adhesive of the adhesive layer 13, the thickness of the adhesive layer 13 can be precisely made even, without using any special process.

In the first and second embodiments shown in FIGS. 1 and 2, the first lens element L1 is made from an optical glass material "FPL53" (product type) produced by OHARA INC., Japan. The second lens element L2 is made from an optical glass material "NSL36" (product type) produced by OHARA INC., Japan. These two lens elements L1 and L2 are cemented to each other to form the cemented lens group 10 serving as an achromatic lens. The diameter of each of the lens elements L1 and L2 is 100 mm.

The cementing surfaces 11 and 12 are formed to have the same radius of curvature, and the filler 14 is included in the adhesive layer 13 so that the thickness of the adhesive layer 13 is 0.1 mm. An addition-reaction silicon resin "KE109" (product name) produced by Shin-Etsu Chemical Co., Ltd., Japan, is used as an adhesive of the adhesive layer 13, and is cured at 40 degrees centigrade for 12 hours.

In the first embodiment shown in FIG. 1, spherical granules of polymethyl methacrylate having an average diameter of 0.1 mm are used as the spherical granules 15 which constitute the filler 14, and are mixed in with the adhesive layer 13. In the second embodiment shown in FIG. 2, cut glass fiber having a diameter of 0.1 mm are used as the glass fiber 16 which constitute the filler 14, and are mixed in with the adhesive layer 13.

The thermal expansion coefficient of FPL53 is $142 \times 10^{-7}$. The thermal expansion coefficient of NSL36 is $76 \times 10^{-7}$. Therefore, if the temperature of the cemented lens group 10 drops from 40 degrees centigrade (temperature at cementing time) to 10 degrees centigrade, the first lens element L1 is contracted so that the diameter thereof decreases by 0.043 mm while the second lens element L2 is contracted so that the diameter thereof decreases by 0.023 mm. Consequently, a difference of 0.02 mm in diameter occurs between the first and second lens elements L1 and L2. This difference causes the periphery of the cementing surfaces 11 and 12 to be mutually displaced by 0.01 mm in a radial direction with respect to an optical axis O. This displacement becomes a cause of exerting a shearing stress on the cementing surfaces 11 and 12 in radial directions. The shearing stress is small in the vicinity of the optical axis O, increases in radial directions away from the optical axis O, and is maximum at the outer edge of the cemented lens group 10.

Figure 3:
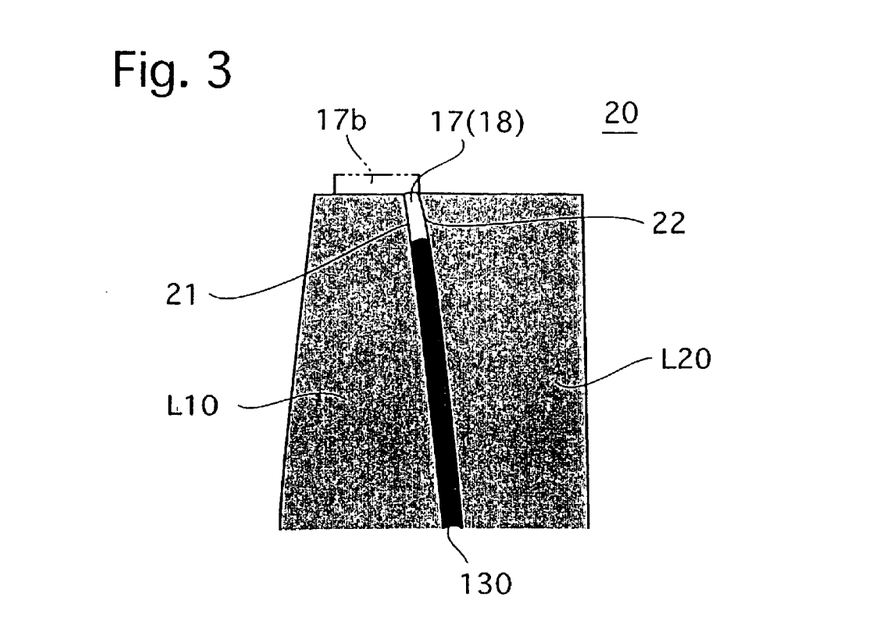
FIG. 3 is a cross-sectional view of a peripheral portion of a third embodiment of a cemented lens group, according to the present invention.
Figure 4:
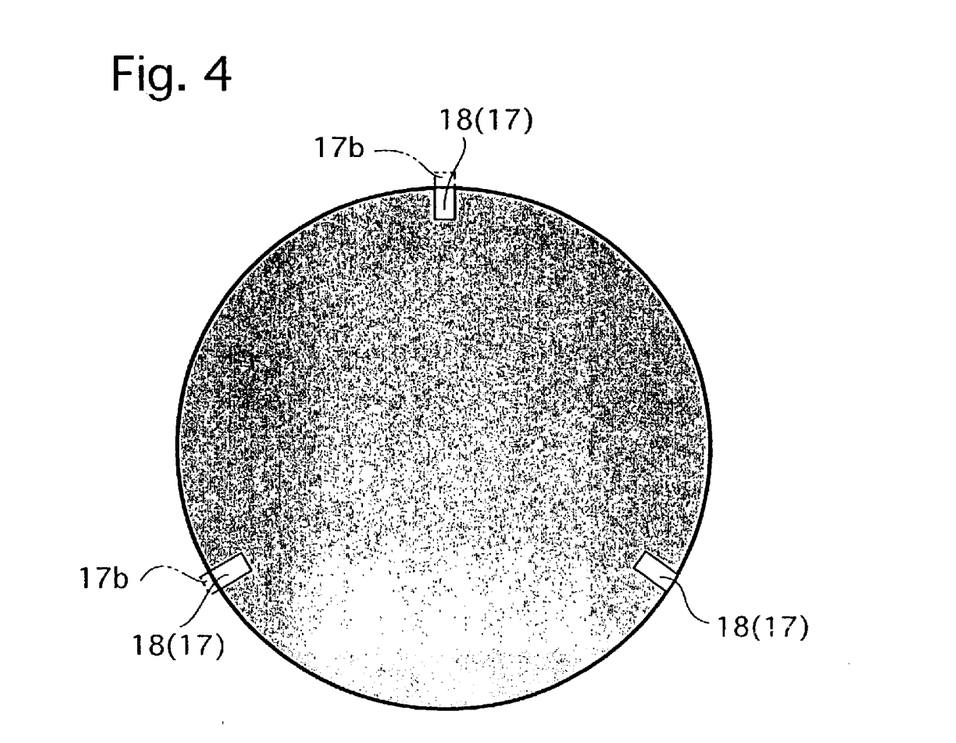
FIG. 4 is a front elevational view of a cementing surface of a cemented lens group shown in FIG. 3.

FIGS. 3 and 4 show a third embodiment of the present invention. In the third embodiment, a cementing surface 21 of a positive first lens element L10 is cemented to a cementing surface 22 of a negative second lens element L20 by an adhesive layer 130. Three spacers (sandwiched portions) 17 are provided at an equip-angular distance of 120° (i.e., discontinuously) in between the cementing surfaces 21 and 22 at the periphery thereof. The spacers 17 are constructed from tin foil 18 which is cut in a rectangular shape. The thickness of the adhesive layer 130 is determined according to the thickness of the tin foil 18 (e.g., 0.1 mm). The radius of curvatures of the cementing surfaces 21 and 22 are the same. The thicknesses of the spacers 17 and the adhesive layers 130 are shown exaggerated for illustration purposes. The adhesive layer 130 maintains elasticity after being cured, wherein expansion and contraction are possible.

Figure 5:
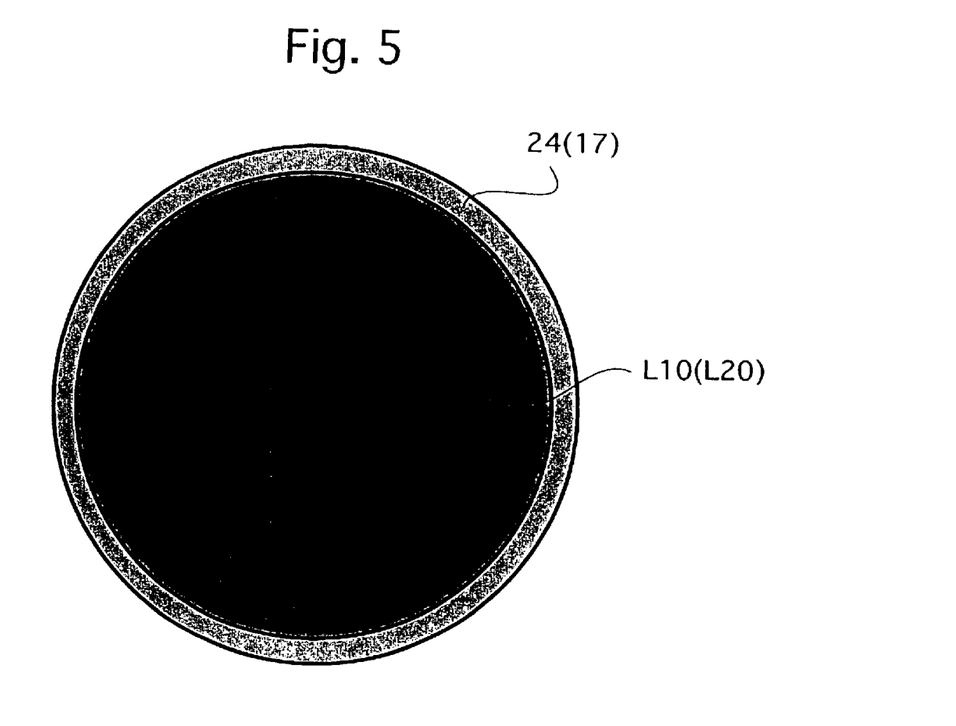
FIG. 5 is a front elevational view of a fourth embodiment of a cemented lens group according to the present invention.
Figure 6:
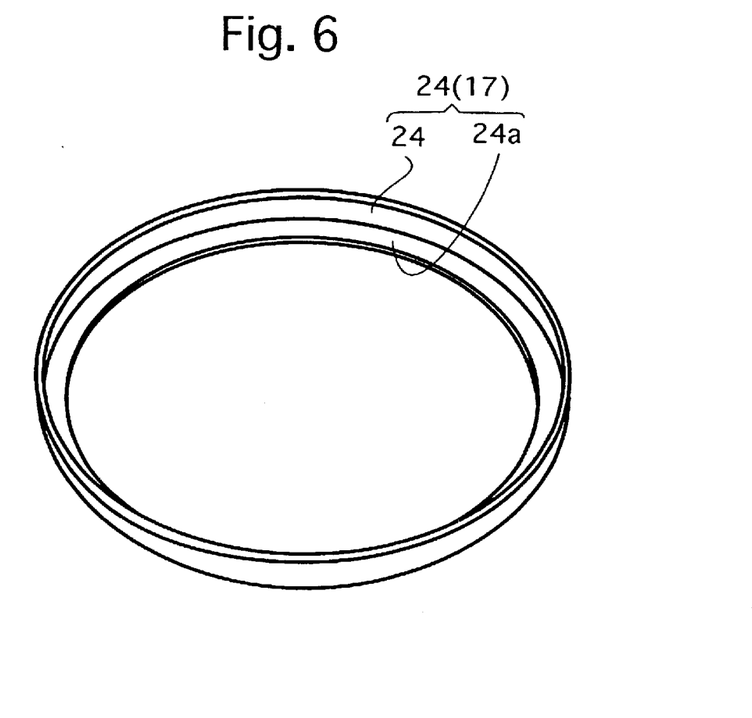
FIG. 6 is a perspective view of a spacer used in the cemented lens group shown in FIG. 5.

FIGS. 5 and 6 show a fourth embodiment of a cemented lens group 20 according to the present invention. FIG. 5 corresponds to FIG. 4, and a sectional view of FIG. 5 corresponds to the sectional view shown in FIG. 3. In the fourth embodiment, the spacer 17 is constructed as a ring-shaped compound-resin sheet (resin film) 24. The ring-shaped compound-resin sheet 24, as shown in FIG. 6, includes a sandwiched portion 24a which is positioned (sandwiched) in between, and continuously around, the peripheral portions of the cementing surfaces 21 and 22, and a peripheral portion 24b which is positioned around the edge portion (cylindrical surface) of either the first lens element L10 or the second lens element L20.

In the fourth embodiment, the thickness of the adhesive layer 130 is determined by the thickness of the sandwiched portion 24a (e.g., 0.1 mm), and the spacer 17 (ring-shaped compound-resin 24) is prevented from moving with respect to the optical axis of the cemented lens group 20 by the peripheral portion 24b. The third embodiment of FIGS. 3 and 4 can also have a peripheral portion 17b which is positioned around the edge portion of the either the first lens element L10 or the second lens element L20, around the periphery of the tin foil 18.

If the spacer 17 is constructed from the ring-shaped compound-resin sheet 24, and if the cementing procedure is carried out in a state wherein the ring-shaped compound-resin sheet 24 is placed onto one of the first and second lens elements L10 and L20, misalignment of the spacer 17 (24) can be avoided, and the efficiency of connecting (cementing) the first and second lens elements L10 and L20 together can be improved.

As described above, by providing the spacer 17 (tin foil 18/ring-shaped compound-resin sheet 24) in between the first and second lens elements L10 and L20, since the thickness of the adhesive layer 130 can be precisely and evenly determined without the use of a special jig, etc., an uneven thickness of the adhesive layer 130 which causes lens eccentricity can be prevented, and deterioration in optical performance can be prevented. Furthermore, since the adhesive layer 130 is distributed evenly on the cementing surfaces, the shearing stress which is applied to the adhesive layer is also even, so that occurrence of irregular deforming and/or separation of the cemented lenses can be prevented.

In a typical cementing operation of a cemented lens group, a liquid adhesive (e.g., an UV curing adhesive or a heat setting adhesive) is dropped onto one of the two cementing surfaces, and thereafter the other cementing surface is placed on this cementing surface. Subsequently, after air bubbles trapped in the adhesive are removed, one of the two lens elements is moved relative to another so that the optical axes of the two lens elements are precisely aligned. Finally, an adhesive hardening operation in which heat or ultraviolet rays are applied to the adhesive to harden the same is performed. In each of the third and fourth embodiments, in the above-described cementing operation, just by placing the spacer 17 in between the first and second lens elements L10 and L20, the thickness of the adhesive 130 can be precisely made even without using any special process.

In the third and fourth embodiments shown in FIGS. 3 and 4, the first lens element L10 is made from an optical glass material "FPL53" (product type) produced by OHARA INC., Japan, and the second lens element L20 is made from an optical glass material "NSL36" (product type) produced by OHARA INC., Japan. These two lens elements L10 and L20 are cemented to each other to form the cemented lens group 20 serving as an achromatic lens. The cementing surfaces 21 and 22 are formed to have the same radius of curvature, and the diameter of each of the lens elements L10 and L20 is 100 mm. The thickness of the spacer 17 (tin foil 18/ring-shaped compound-resin sheet 24) which is sandwiched in between the cementing surfaces 21 and 22 is 0.1 mm, so that the thickness of the adhesive layer 130 is substantially 0.1 mm. An addition-reaction silicon resin "KE109" (product name) produced by Shin-Etsu Chemical Co., Ltd., Japan, is used as an adhesive of the adhesive layer 130, and is cured at 40 degrees centigrade for 12 hours.

The thermal expansion coefficient of FPL53 is $142 \times 10^{-7}$. The thermal expansion coefficient of NSL36 is $76 \times 10^{-7}$. Therefore, if the temperature of the cemented lens group 20 drops from 40 degrees centigrade (temperature at cementing time) to 10 degrees centigrade, the first lens element L10 is contracted so that the diameter thereof decreases by 0.043 mm while the second lens element L20 is contracted so that the diameter thereof decreases by 0.023 mm. Consequently, a difference of 0.02 mm in diameter occurs between the first and second lens elements L10 and L20. This difference causes the periphery of the cementing surfaces 21 and 22 to be mutually displaced by 0.01 mm in a radial direction with respect to an optical axis O. This displacement becomes a cause of exerting a shearing stress on the cementing surfaces 21 and 22 in radial directions. The shearing stress is small in the vicinity of the optical axis O, increases in radial directions away from the optical axis O, and is maximum at the outer edge of the cemented lens group 20.

In conventional cemented lens groups, the thickness of the adhesive layer between two cementing surfaces is approximately a few micrometers by experience. In such conventional cemented lens groups, the adhesive layer cannot fully absorb the aforementioned shearing stress because the magnitude of a radial displacement between the periphery of the two cementing surface due to expansion/contraction of the lens elements reaches several times of the thickness of the adhesive layer. Accordingly, the cemented lens group is deformed if the strength of the adhesive layer is high, or the cementing surfaces may come off each other by the shearing stress if the strength of the adhesive layer is low.

The first and second embodiments satisfy condition (1). In this case, a radial displacement between the periphery of the cementing surfaces 11 and 12 is approximately one tenth of the thickness of the adhesive layer 13. In addition, the elongation of the aforementioned addition-reaction silicon resin KE109 from which the adhesive layer 13 is made is approximately 150 percent. Accordingly, the adhesive layer 13 can easily absorb a radial displacement between the periphery of the cementing surfaces 11 and 12 which is caused by expansion/contraction of the first and second lens elements L1 and L2.

In a cemented lens group consisting of two lens elements cemented to each other, the magnitude of a displacement between the periphery of the cementing surfaces of the two lens elements in a radial direction when the two lens elements expand or contract due to a temperature variation depends on a difference in a linear expansion coefficient between the two lens elements, the diameter of the cemented lens group and a range of temperature variation of the cemented lens group. The magnitude of such a displacement is represented by the following equation (A):

$$\Delta h = \Delta \alpha \cdot D \cdot \Delta T / 2 \tag{A};$$

wherein $\Delta h$ represents the magnitude of a displacement between the periphery of the cementing surfaces of the two lens elements in a direction radially outwards or inwards when the two lens elements expand or contract due to a temperature variation;

$\Delta \alpha$ represents a difference in linear expansion coefficient between the two lens elements cemented to each other;

D represents the diameter of each of the cemented lens elements; and $\Delta T$ represents the range of temperature variation of the cemented lens group.

If it is assumed that the adhesive layer between the two lens elements has elasticity, and elongation of at least 100 percent, the shearing stress exerted on the adhesive layer can be absorbed sufficiently by the elasticity of the adhesive layer if the thickness of the adhesive layer is more than double the displacement ($\Delta h$). Namely, the shearing stress exerted on the cementing surfaces which is caused by expansion/contraction of the two lens elements can be absorbed sufficiently by satisfying the following condition (B):

$$2 \cdot |\Delta h| < d \tag{B}$$

wherein d represents the thickness of the adhesive layer.

From the equation (A) and condition (B), the following condition (C) is derived:

$$|\Delta \alpha \cdot D/d| < 1/\Delta T \tag{C}.$$

The following condition (1) shows a case where the aforementioned condition (C) is satisfied when it is assumed that the range of temperature variation of the cemented lens group is 30 degrees centigrade.

$$|\Delta \alpha \cdot D/d| < 0.03 \tag{1}$$

Accordingly, defining the numerical values of the variables in condition (C) makes it possible for the adhesive layer to sufficiently absorb the shearing stress exerted on the cementing surfaces which is caused by expansion/contraction of the two lens elements.

If $|\Delta \alpha \cdot D/d|$ in condition (1) is equal to or greater than the upper limit (=0.03), the thickness of the adhesive layer becomes so small that the adhesive layer cannot absorb the shearing stress exerted on the cementing surfaces.

If the workability of cementing the lens elements, the environment, the optical performance of the adhesive of the adhesive layer, the cost of production and so forth are taken into consideration, an optimum adhesive having an ideal elasticity cannot always be used. In this case, it is desirable that the thickness of the adhesive layer be determined by the following condition (1'):

$$|\Delta \alpha \cdot D/d| < 0.01 \tag{1'}.$$

If $|\Delta \cdot D/d|$ in condition (1') is equal to or greater than the upper limit (=0.01), the thickness of the adhesive layer becomes so small that the adhesive layer cannot absorb the shearing stress exerted on the cementing surfaces, depending on the elasticity of the adhesive of the adhesive layer.

When the lens elements of the cemented lens group are cemented to each other by an adhesive which becomes elastic after being cured, the adhesive layer is deformed by the own weight of each lens element to thereby cause the cemented lens elements to become eccentric with respect to each other if the adhesive layer is excessively thick. To prevent this problem from occurring, defining the thickness of the adhesive layer as an optimum thickness using the following condition (2) makes it possible to reduce the eccentricity.

$$d/D < 0.002 \tag{2}.$$

If d/D is equal to or greater than the upper limit (=0.002), the adhesive layer becomes excessively thick, so as to cause the cemented lens elements to become eccentric relative to each other to thereby deteriorate the optical performance of the cemented lens group.

Although the lower limit of the thickness of the adhesive layer is determined by the aforementioned conditions (1) or (1'), the thickness of the adhesive layer can be set to a degree of the thickness of an adhesive layer of a conventional cemented lens group, depending on a difference in diameter between the cemented lens elements of the cemented lens group or a difference in linear expansion coefficient between cemented lens elements of the cemented lens group.

The following condition (3) specifies a condition which defines the lower limit of the optimum thickness of the adhesive layer of the cemented lens group.

$$d>0.015 \text{ mm} \tag{3};$$

wherein d represents the thickness of the adhesive layer.

If d is equal to or smaller than the lower limit (=0.015 mm), there is no merit in producing such a cemented lens group according to the present invention in terms of the production cost since the thickness of the adhesive layer can be reduced to a degree of the thickness of an adhesive layer of a conventional cemented lens group.

Although the upper limit of the thickness of the adhesive layer is determined by condition (2), there is a possibility of the adhesive layer becoming so thick that the cemented lens elements become largely decentered relative to each other due to an elastic deformation of the adhesive layer, depending on a difference in diameter between the cemented lens elements or a difference in linear expansion coefficient between the cemented lens elements.

The following condition (4) specifies a condition which defines the upper limit of the thickness of the adhesive layer so that the cemented lens elements of the cemented lens group are slightly decentered relative to each other by an elastic deformation of the adhesive layer.

$$d<0.2 \text{ mm} \tag{4}$$

If d is equal to or greater than the upper limit (=0.2 mm), the thickness of the adhesive layer becomes so thick as to make the cemented lens elements become eccentric largely relative to each other.

As mentioned above, the thickness of the adhesive layer can be set to a degree of the thickness of an adhesive layer of a conventional cemented lens group, depending on a difference in diameter between the positive lens element and the negative lens element of the cemented lens group or a difference in linear expansion coefficient between the positive lens element and the negative lens element of the cemented lens group.

The following condition (5) specifies a condition which defines the diameter of the cemented lens group according to the present invention to maximize the effectiveness thereof.

$$D>80 \text{ mm} \tag{5};$$

wherein D represents the diameter of each of the cemented lens elements. If D is equal to or smaller than the lower limit (=80 mm), there is no merit in producing such a cemented lens group in terms of the production cost since the thickness of the cemented lens group does not have to be increased.

The present invention can advantageously be applied to a cemented lens group in which a lens element of a typical glass material and a lens element of a glass material having a large linear expansion coefficient such as fluorite or a low-dispersion glass are cemented to each other, especially to such a cemented lens group in which a difference in linear expansion coefficient between the cemented lens elements is great.

The following condition (6) specifies a condition which defines a difference in linear expansion coefficient between the cemented lens elements.

$$|\Delta\alpha|>0.0000015 \tag{6};$$

wherein $\Delta\alpha$ represents a difference in linear expansion coefficient between the two lens elements cemented to each other.

If $|\Delta\alpha|$ is equal to or smaller than the lower limit (=0.0000015), there is no merit in producing such a cemented lens group in terms of the production cost since the thickness of the cemented lens group does not have to be increased in the case where lens elements having a small difference in linear expansion coefficient therebetween are cemented to each other.

In the first and second embodiments of the cemented lens group shown in FIGS. 1 and 2, a silicon resin made of an organic silicon compound is used as an adhesive for the adhesive layer 13. Although various types silicon resins are available, silicon resins having stable chemical property and which become transparent when cured are suitable to a use for the adhesive of the adhesive layer. Specifically, an adhesive having a high elasticity after being cured that does not vary even in a low temperature is suitable for the adhesive of the adhesive layer when lens elements, each having a large diameter or having a large difference in linear expansion coefficient between the lens elements, are cemented to each other.

Silicon resins are roughly divided into two types in terms of the difference of the curing process: addition-reaction type that hardens by heat, and condensation-reaction type that hardens by reaction with moisture included in the air. If the latter type is used as an adhesive for cementing two lens elements, the adhesive does not easily harden at a central portion of the adhesive layer since moisture included in the air does not easily reach the central portion of the adhesive layer. On the other hand, some condensation-reaction type silicon resins harden at an ambient temperature, and are therefore suitable to be used for the adhesive of the adhesive layer.

It is desirable that silicon resin having a high elasticity after being cured be used as an adhesive of the adhesive layer 13, such a silicon resin having an elongation of at least 100 percent.

According to the present invention, shearing stress exerted on the cementing lens surfaces 11 and 12, which is caused by expansion/contraction of the lens elements, is absorbed by the adhesive layer 13. Accordingly, the present invention is not limited solely to a particular case wherein the lens elements having a great difference in linear expansion coefficient between the cemented lens elements or the lens elements each having a large diameter are cemented to each other, but can be applied to a cemented lens group used under a wide temperature range to attain satisfactory results.

Table 1 shows the numerical values corresponding to each condition of the first through fourth embodiments. The first through fourth embodiments share the same numerical values, and satisfy each of conditions (1) through (6).

TABLE 1

| | Embodiments 1, 2, 3 and 4 (FIGS. 1, 2, 3 and 4) |
|---|---|
| $\alpha p$ | 0.0000142 |
| $\alpha n$ | 0.0000076 |

TABLE 1-continued

| | Embodiments 1, 2, 3 and 4 (FIGS. 1, 2, 3 and 4) |
|---|---|
| Δα | 0.0000066 |
| D | 100.0 |
| d | 0.10 |
| \|Δα · D/d\| | 0.0066 |
| d/D | 0.001 |

According to the present invention, a cemented lens group, especially a large diameter cemented lens group, can be achieved which does not deform nor do the cementing surfaces thereof come off each other (separate), even in the case where a lens element formed from a special glass such as fluorite or a low-dispersion glass is cemented to an ordinary glass lens.

Furthermore, according to the present invention, even if the adhesive layer is elastically deformed due to the weight of the lens elements, the optical performance deteriorates little, and by dispersing filler within the adhesive layer, the thickness of the adhesive layer between the lens elements can be easily and precisely managed.

Alternatively, by providing a spacer in between the lens elements of the cemented lens group, the thickness of the adhesive layer between the lens elements can be easily and precisely managed.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A cemented lens group comprising two lens elements, cementing surfaces of said two lens elements being cemented to each other by an adhesive, said adhesive forming an adhesive layer between said cementing surfaces;
   wherein a filler made of minute solid material is dispersed throughout said adhesive layer, and
   wherein the following condition (1) is satisfied:

$$|\Delta \alpha \cdot D/d| < 0.03 \tag{1}$$

wherein Δα designates a difference in linear expansion coefficient between said two lens elements cemented to each other;
   D designates the diameter of each of said lens elements; and
   d designates a thickness of said adhesive layer having said filler included therein.

2. The cemented lens group according to claim 1, wherein said filler comprises resin granules.

3. The cemented lens group according to claim 1, wherein said filler comprises glass fiber granules.

4. The cemented lens group according to claim 1, wherein said filler comprises cut glass fibers.

5. The cemented lens group according to claim 1, wherein the following condition (1') is satisfied:

$$|\Delta \alpha \cdot D/d| < 0.01 \tag{1'}$$

wherein Δα designates a difference in linear expansion coefficient between said two lens elements cemented to each other;
   D designates the diameter of each of said lens elements; and
   d designates a thickness of said adhesive layer having said filler included therein.

6. The cemented lens group according to claim 1, wherein the following condition (2) is satisfied:

$$d/D < 0.002 \tag{2}$$

wherein D designates the diameter of each of said lens elements; and
   d designates a thickness of said adhesive layer having said filler included therein.

7. The cemented lens group according to claim 1, wherein the following condition (3) is satisfied:

$$d > 0.015 \text{ mm} \tag{3}$$

wherein d designates a thickness of said adhesive layer having said filler included therein.

8. The cemented lens group according to claim 1, wherein the following condition (4) is satisfied:

$$d < 0.2 \text{ mm} \tag{4}$$

wherein d designates a thickness of said adhesive layer having said filler included therein.

9. The cemented lens group according to claim 1, wherein the following condition (5) is satisfied:

$$D > 80 \text{ mm} \tag{5}$$

wherein D designates the diameter of each of said lens elements.

10. The cemented lens group according to claim 1, wherein the following condition (6) is satisfied:

$$|\Delta \alpha| > 0.0000015 \tag{6}$$

wherein Δα designates a difference in linear expansion coefficient between said two lens elements cemented to each other.

11. The cemented lens group according to claim 1, wherein said adhesive comprises a silicon resin having an elongation of at least 100 percent.

12. A cemented lens group comprising two lens elements, cementing surfaces of said two lens elements being cemented to each other by an adhesive, said adhesive forming an adhesive layer between said cementing surfaces;
    wherein a filler made of minute solid material is dispersed throughout said adhesive layer, and
    wherein said adhesive comprises a silicon resin made of an organic silicon compound.

13. The cemented lens group according to claim 12, wherein said adhesive comprises an addition-reaction silicon resin.

14. A cemented lens group comprising two lens elements, cementing surfaces of said two lens elements being cemented to each other by an adhesive, said adhesive forming an adhesive layer between said cementing surfaces;
    wherein a spacer which determines the thickness of said adhesive layer is provided around the peripheral portions of said cementing surfaces.

15. The cemented lens group according to claim 14, wherein said spacer is provided discontinuously around said peripheral portions of said cementing surfaces.

16. The cemented lens group according to claim 15, wherein said spacer comprises a sandwiched portion which is sandwiched in between said peripheral portions of said cementing surfaces, and a peripheral portion which is provided around an edge portion of one of said two lens elements.

17. The cemented lens group according to claim 14, wherein said spacer is provided continuously around said peripheral portions of said cementing surfaces.

18. The cemented lens group according to claim 17, wherein said spacer comprises a sandwiched portion which is sandwiched in between said peripheral portions of said cementing surfaces, and a peripheral portion which is provided around an edge portion of one of said two lens elements.

19. The cemented lens group according to claim 14, wherein said spacer is made from one of a resin film and a resin sheet.

20. The cemented lens group according to claim 14, wherein said spacer is made from tin foil.

21. The cemented lens group according to claim 14, wherein the following condition (1) is satisfied:

$$|\Delta\alpha \cdot D/d| < 0.03 \tag{1}$$

wherein $\Delta\alpha$ designates a difference in linear expansion coefficient between said two lens elements cemented to each other;

D designates the diameter of each of said lens elements; and d designates a thickness of said adhesive layer determined by said spacer.

22. The cemented lens group according to claim 14, wherein the following condition (1') is satisfied:

$$|\Delta\alpha \cdot D/d| < 0.01 \tag{1'}$$

wherein $\Delta\alpha$ designates a difference in linear expansion coefficient between said two lens elements cemented to each other;

D designates the diameter of each of said lens elements; and d designates a thickness of said adhesive layer determined by said spacer.

23. The cemented lens group according to claim 14, wherein the following condition (2) is satisfied:

$$d/D < 0.002 \tag{2}$$

wherein D designates the diameter of each of said lens elements; and d designates a thickness of said adhesive layer determined by said spacer.

24. The cemented lens group according to claim 14, wherein the following condition (3) is satisfied:

$$d > 0.015 \text{ mm} \tag{3}$$

wherein d designates a thickness of said adhesive layer determined by said spacer.

25. The cemented lens group according to claim 14, wherein the following condition (4) is satisfied:

$$d < 0.2 \text{ mm} \tag{4}$$

wherein d designates a thickness of said adhesive layer determined by said spacer.

26. The cemented lens group according to claim 14, wherein the following condition (5) is satisfied:

$$D > 80 \text{ mm} \tag{5}$$

wherein D designates the diameter of each of said lens elements.

27. The cemented lens group according to claim 14, wherein the following condition (6) is satisfied:

$$|\Delta\alpha| > 0.0000015 \tag{6}$$

wherein $\Delta\alpha$ designates a difference in linear expansion coefficient between said two lens elements cemented to each other.

28. The cemented lens group according to claim 14, wherein said adhesive comprises a silicon resin made of an organic silicon compound.

29. The cemented lens group according to claim 28, wherein said adhesive comprises an addition-reaction silicon resin.

30. The cemented lens group according to claim 14, wherein said adhesive comprises a silicon resin having an elongation of at least 100 percent.

* * * * *